United States Patent
El-Batal

(10) Patent No.: US 7,395,460 B2
(45) Date of Patent: *Jul. 1, 2008

(54) FAILED DRIVE LOCATOR FOR REMOVABLE DISK ARRAY MODULES

(75) Inventor: Mohamad El-Batal, Westminster, CO (US)

(73) Assignee: LSI Corporation, Milpitas, CA (US)

( * ) Notice: Subject to any disclaimer, the term of this patent is extended or adjusted under 35 U.S.C. 154(b) by 508 days.

This patent is subject to a terminal disclaimer.

(21) Appl. No.: 10/817,344

(22) Filed: Apr. 2, 2004

(65) Prior Publication Data
US 2005/0240825 A1 Oct. 27, 2005

(51) Int. Cl.
*G06F 11/00* (2006.01)

(52) U.S. Cl. .............................. 714/57; 714/42; 714/46
(58) Field of Classification Search .................. None
See application file for complete search history.

(56) References Cited

U.S. PATENT DOCUMENTS

| | | | | | |
|---|---|---|---|---|---|
| 5,305,013 | A | * | 4/1994 | Daniels | 345/82 |
| 5,367,647 | A | * | 11/1994 | Coulson et al. | 710/105 |
| 5,754,112 | A | * | 5/1998 | Novak | 340/635 |
| 5,790,374 | A | * | 8/1998 | Wong | 361/685 |
| 5,864,659 | A | * | 1/1999 | Kini | 714/31 |
| 5,966,510 | A | * | 10/1999 | Carbonneau et al. | 714/44 |
| 6,055,653 | A | * | 4/2000 | LeBlanc et al. | 714/718 |
| 6,505,272 | B1 | * | 1/2003 | Bouvier et al. | 711/111 |
| 6,654,816 | B1 | * | 11/2003 | Zaudtke et al. | 710/1 |
| 6,778,409 | B2 | * | 8/2004 | Jones | 361/796 |
| 6,907,500 | B2 | * | 6/2005 | Suzuki et al. | 711/114 |
| 2002/0054477 | A1 | * | 5/2002 | Coffey et al. | 361/686 |
| 2002/0133736 | A1 | * | 9/2002 | Faber et al. | 714/5 |
| 2005/0144508 | A1 | * | 6/2005 | McKean et al. | 714/5 |

FOREIGN PATENT DOCUMENTS

JP         2000201204 A  *  7/2000

* cited by examiner

*Primary Examiner*—Gabriel L Chu
(74) *Attorney, Agent, or Firm*—Cochran Freund & Young LLC

(57) ABSTRACT

An apparatus for locating failed disk drives on a disk array module when the disk-array module is removed from its enclosure is described.

10 Claims, 2 Drawing Sheets

FAILED DRIVE LOCATOR FOR REMOVABLE DISK ARRAY MODULES

CROSS REFERENCE TO RELATED APPLICATIONS

The present application claims the benefit of U.S. patent application Ser. No. 10/731,191 for "Onboard Indicator" by Mohamad El-Batal et al., which was filed on Dec. 8, 2003, the contents of which are hereby incorporated by reference herein for all they disclose and teach.

FIELD OF THE INVENTION

The present invention relates generally to disk-array modules and, more particularly, to an apparatus and method for detecting failed disk drives when a disk-array module is removed from its enclosure for service.

BACKGROUND OF THE INVENTION

It is often necessary to determine the location of a failed disk drive when the disk-array module that the subject disk belongs to is removed from its storage system for service. The loss of connectivity between the individual disk and the system to which it belongs prevents an individual responsible for servicing the storage system from identifying the failed disk. An apparatus and method for identifying failed disk drives is described in U.S. patent application Ser. No. 10/731,191 for "Onboard Indicator," supra. Therein, circuitry for recording the identity of a disk-drive indicated by a host controller as having failed is located on-board a disk array module to which the disk drive belongs. The host controller, indicators identifying the failed drive, and circuitry for reading and driving the indicators are all located on-board the module. Additionally, reset circuitry for detecting and indicating whether service has been performed on the disk drive is located on the module.

As modules become more crowded, however, it has become more difficult to locate some or all of these components on-board the module.

Accordingly, it is an object of the present invention to provide a method and apparatus for identifying failed disk drives on a disk drive module that has been removed from its in-service location using apparatus located off the module and readily placed in electrical communication therewith.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus for locating a failed disk drive in a plurality of disk drives on a removable disk array module having a backplane connector includes: a host controller disposed on the disk array module for identifying a failed disk drive and for determining the location thereof on the module; a non-volatile memory device disposed on the module for receiving the location of the failed disk drive from the host controller and for recording same; and a portable disk locator adapted for communicating with said non-volatile memory device, and for displaying the location of the failed disk drive.

Benefits and advantages of the present invention include locating a failed disk drive on a disk array module when the module has been removed from its enclosure.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Briefly, the present invention includes an apparatus for detecting and locating failed disk drives when a disk-array module is removed from its enclosure for service. A central controller which controls the operations of the individual disks in the disk array modules, identifies any failed disk drives, and records the location of the failed disk on a Serial-Electrically Erasable Programmable Read Only Memory (EEPROM) during the time that the disk array module is in electrical contact with the enclosure and the controller. Once the module is removed from its enclosure, the controller ceases to control that module, and no further information is provided to the EEPROM from the disk array module, or from other disk array modules in a data storage system. The locator apparatus of the present invention is a portable device adapted for use by a service technician, and includes a battery-pack, and low-power processor capable of reading drive status information from the EEPROM into a Serial-General Purpose Input-Output (GPIO). The GPIO is connected to individual drive indicators located on the locator apparatus in a numbered grid array that matches the disk drive positioning grid through a serial bus connection, such as a 12C serial bus connection, to the disk array module backplane connector. This permits the service technician to locate the failed disk. The serial bus has multiple power and ground connections for supplying power to an isolated fault diagnosis power plain which in turn supplies power to the Serial-EEPROM, the Serial-GPIO device(s) and the drive fault indicators. The GPIO can also drive a display that identifies the coordinates of the failed disk drive.

In another embodiment of the invention, the disk fault indicators could be a plurality of light emitting diodes (LEDs) located on the disk-array module midplane, one or more LEDs disposed near each disk. When the locator device is attached to the disk drive module, the serial-GPIO device activates specific fault LEDs which identify failed drives.

The Serial-EEPROM device is powered by the storage system power source during normal operations when the disk array module is in contact with the system, and allows the system processor to program the drive fault status information as a change is detected during the system operation. The power source to the Serial-EEPROM will be diode ORed.

Figure 1:
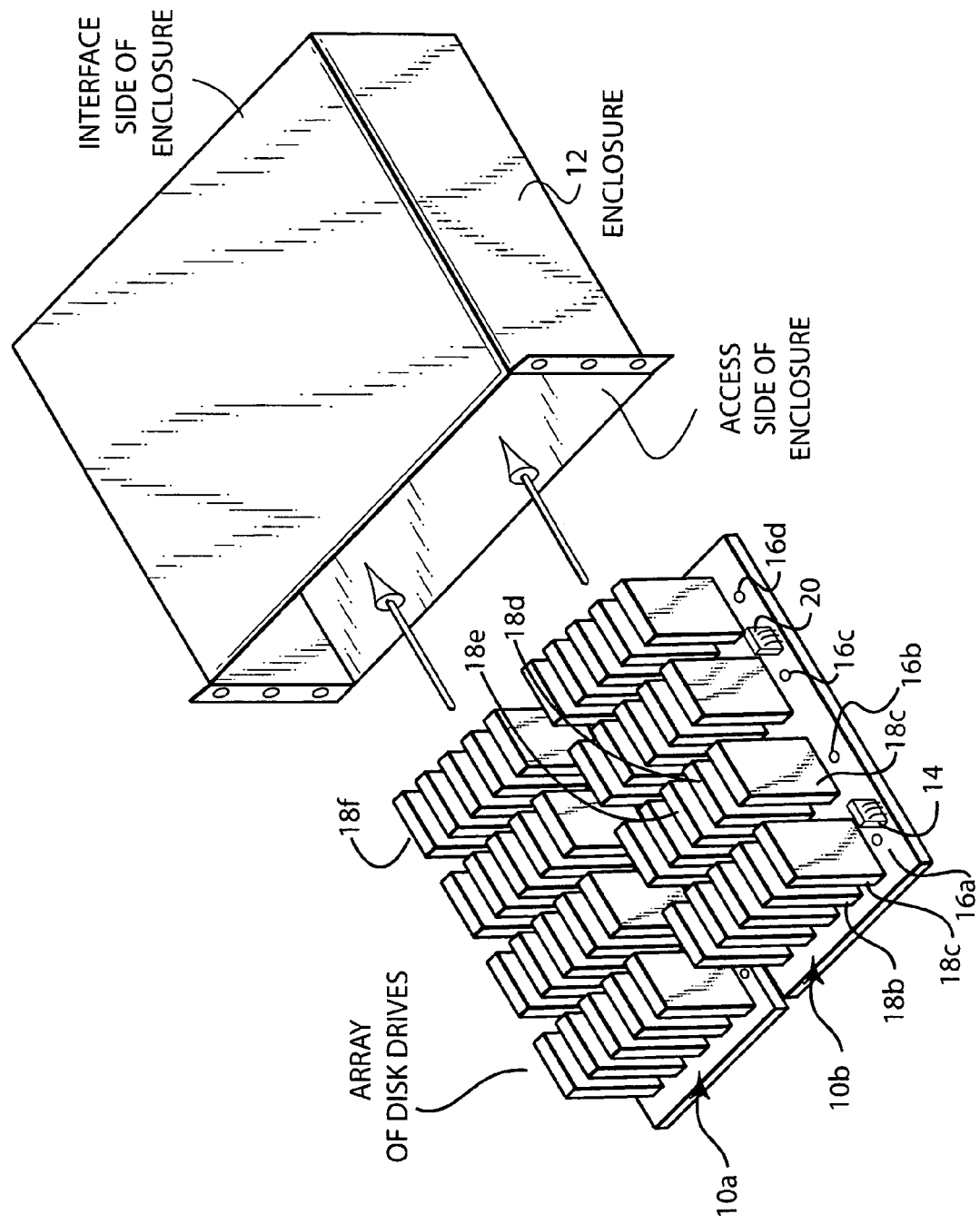
FIG. 1 is a schematic representation of a perspective view of two disk array modules having been removed from an enclosure, showing a plurality of disk drives, a host controller, a memory device, and disk status indicators.

Reference will now be made in detail to the present embodiments of the invention, examples of which are illustrated in the accompanying drawings. Similar or identical structure in the drawings will be identified by identical callouts. Turning now to the figures, FIG. 1 is a schematic representation of a perspective view of two removable disk array modules, 10a and 10b, which are shown having been removed from enclosure or bin, 12. Shown also are host controller, 14, and indicator devices, 16a-16d, for identifying the status of the individual disk drives, 18a-18f. Indicator devices 16a-16d can be light emitting diodes (LEDs), as an example of such devices. Disk drive modules 10a and 10b are placed in communication with bin 12 which in turn can communicate with other such modules to form a data storage system, as an example. Host controller, 14, determines the function of each disk drive and module, orchestrates the interaction among the drives and, in particular, determines when a disk drive fails. Once a failed disk drive is identified by host controller 14, its location is recorded on non-volatile memory device, 20, which may be a Serial-EEPROM, as an example of such a device.

Figure 2:
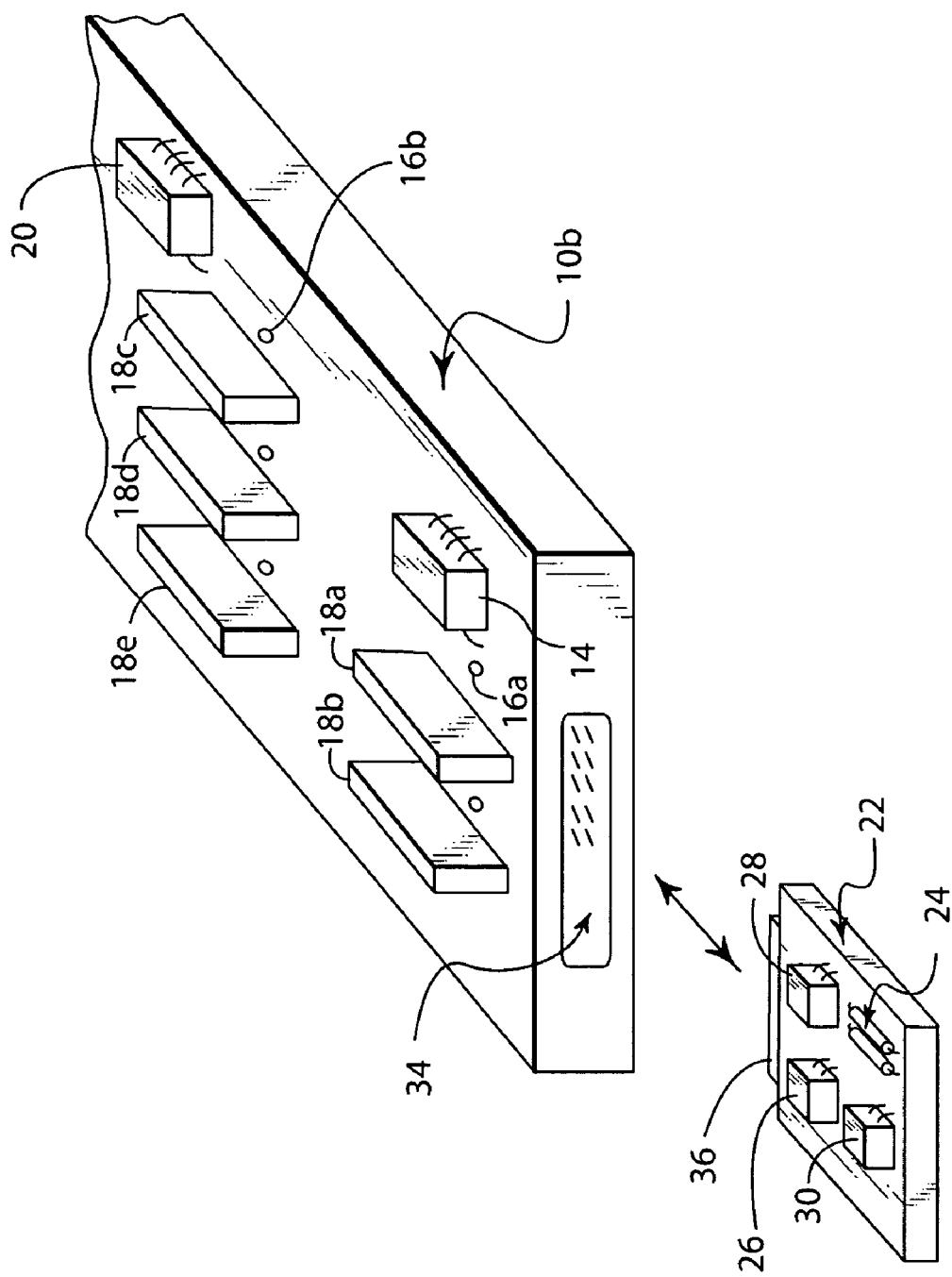
FIG. 2 is a schematic representation of an embodiment of the failed disk locator device of the present invention.

FIG. 2 is a schematic representation of an embodiment of the failed disk locator apparatus, 22, of the present invention, showing power supply, 24, low-power processor, 26, for reading the failed disk location information from non-volatile memory 14, through Serial-GPIO, 28, and through a serial bus (not shown) for directing the electrical input and output of disk location module, 22, to desired locations, and resetting means, 30. Resetting means 30 permits the service technician to reset memory device 20 to indicate that a failed disk drive has been replaced. Also shown in FIG. 2 are bin backplane connector, 34, of disk array module 10b, and mating connector, 36, on disk locator device 22 for permitting disk drive module, 10a and disk locator device 22 to communicate. Moreover, power supply 24 can provide power to indicator devices 16a-16d on disk array module 10 through mating connector 36 when instructed to do so by disk locator apparatus 22. Although batteries are shown for power supply 24, any electrical power source having the appropriate voltage and current capabilities can be employed.

In operation, disk locator apparatus 22 can direct indicator devices 16 on disk array module 10 to identify which of the disk drives 18 has failed, identify the failed disk on a pattern of indicators similar to the pattern of the disk drives on disk array module 10 located on disk locator apparatus 22 (not shown), or display the grid location numerically on a display device located on disk locator apparatus 22 (not shown).

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for locating a failed disk drive in a plurality of disk drives on a removable disk array module having a midplane, and a backplane connector, said disk array module having been taken out of service, comprising in combination:

a host controller disposed on said disk array module for identifying a failed disk drive and for determining the location thereof on said disk array module;

a non-volatile memory device disposed on said disk array module for receiving the location of the failed disk drive from said host controller, and for recording same;

a plurality of indicator devices, at least one indicator device of said plurality of indicator devices being disposed on the midplane near each of said disk drives, wherein the location of a failed disk drive is displayed by activation of said indicator device corresponding to that disk drive; and a portable disk locator adapted for communicating with said nonvolatile memory device, and for causing the location of the failed disk drive to be displayed, said portable disk locator having a processor for reading said non-volatile memory device, an input-output device connected to said processor for driving said at least one indicator device in response to a disk failure, and a power supply for providing electrical energy to the components of said portable disk locator.

2. The apparatus of claim 1, wherein said portable disk locator comprises means for resetting said non-volatile memory device when the failed disk has been repaired or replaced.

3. The apparatus of claim 1, wherein said portable disk locator device comprises a connector adapted for mating with the backplane connector of said removable disk array module, such that said portable disk location module is placed in electrical communication with said non-volatille memory device.

4. The apparatus of claim 1, wherein said power supply comprises a battery power supply.

5. The apparatus of claim 1, wherein said portable disk locator device comprises a connector adapted for mating with the backplane connector of said removable disk array module, such that said a least one indicator device of said plurality of indicator devices disposed in the vicinity of each disk drive can receive electrical power.

6. An apparatus for locating a failed disk drive in a plurality of disk drives on a removable disk array module having a midplane, and a backplane connector, said disk array module having been taken out of service, comprising in combination:

means disposed on said disk array module for identifying a failed disk drive and for determining the location thereof on said disk array module;

means disposed on said disk array module for receiving the location of the failed disk drive from said means for identifying a failed disk drive, and for recording same;

a plurality of indicator devices, at least one indicator device of said plurality of indicator devices being disposed on the midplane near each of said disk drives; and a portable disk locator adapted for communicating with said means for receiving and recording the location of a failed disk drive that the location of a failed disk drive is displayed by activation of said indicator device corresponding to that disk drive, said portable disk locator having a power supply for providing electrical energy thereto.

7. The apparatus of claim 6, wherein said portable disk locator comprises means for resetting said means for recording the location of a failed disk drive when the failed disk has been repaired or replaced.

8. The apparatus of claim 6, wherein said portable disk locator device comprises a connector adapted for mating with the backplane connector of said removable disk array module, such that said portable disk location module is placed in electrical communication with said means for recording the location of a failed disk drive.

9. The apparatus of claim 6, wherein said power supply comprises a battery power supply.

10. The apparatus of claim 6, wherein said portable disk locator device comprises a connector adapted for mating with the backplane connector of said removable disk array module, such that said at least one indicator device of said plurality of indicator devices disposed in the vicinity of each disk drive can receive electrical power.

* * * * *